(No Model.) 2 Sheets—Sheet 1.
T. HIGGIN.
PROCESS OF SEPARATING SAND SCALE, HARD PAN SCALE AND OTHER IMPURITIES FROM SALT.
No. 364,587. Patented June 7, 1887.
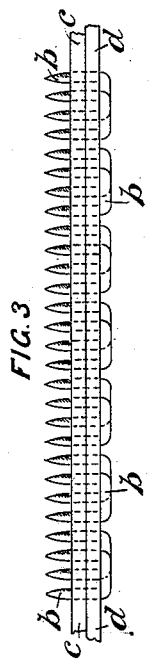
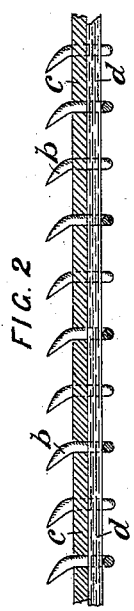
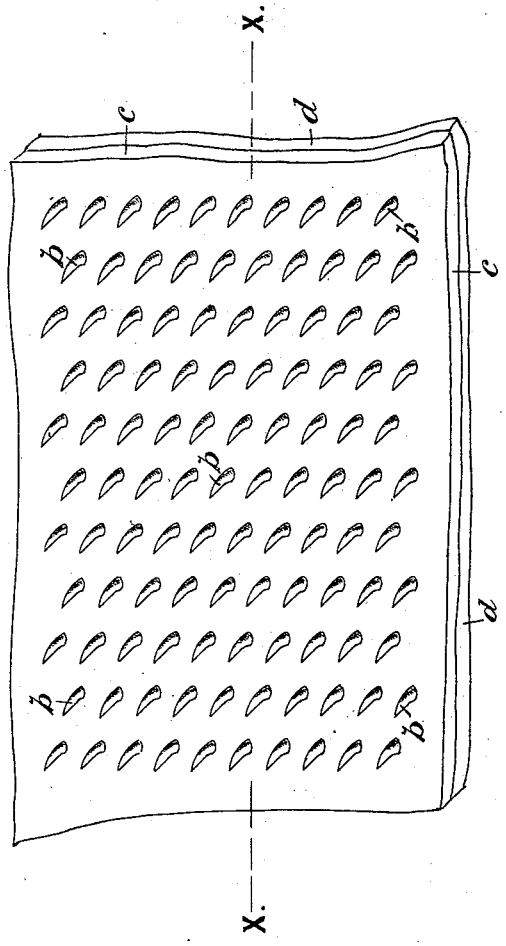
WITNESSES
Harold Morgan Smith
Robert Bartlett
INVENTOR
Thomas Higgin
by Bradhard Hill
Attys.

(No Model.) 2 Sheets—Sheet 2.
T. HIGGIN.
PROCESS OF SEPARATING SAND SCALE, HARD PAN SCALE AND OTHER IMPURITIES FROM SALT.
No. 364,587. Patented June 7, 1887.
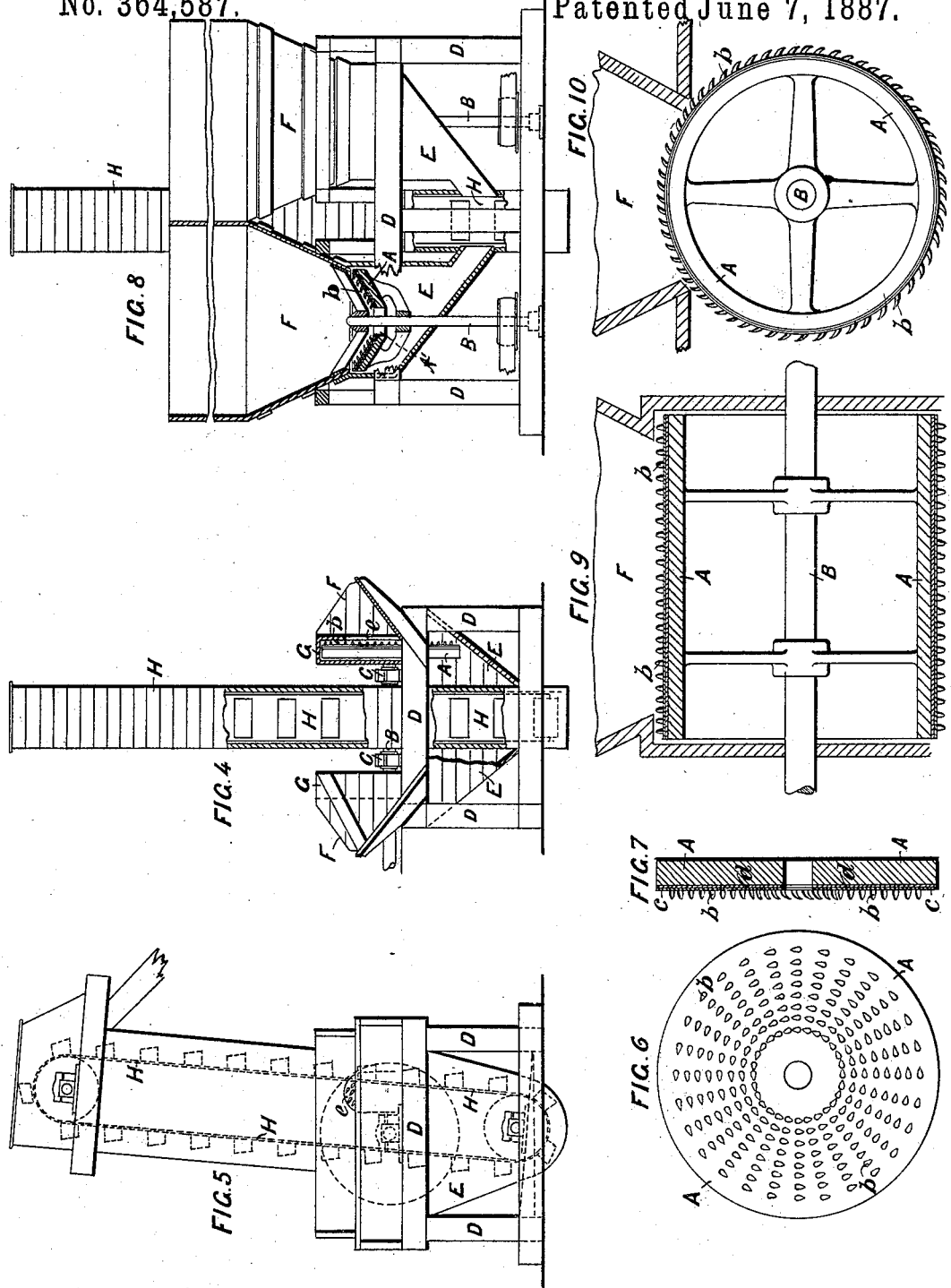
WITNESSES
INVENTOR

UNITED STATES PATENT OFFICE.

THOMAS HIGGIN, OF LIVERPOOL, COUNTY OF LANCASTER, ENGLAND.

PROCESS OF SEPARATING SAND-SCALE, HARD PAN-SCALE, AND OTHER IMPURITIES FROM SALT.

SPECIFICATION forming part of Letters Patent No. 364,587, dated June 7, 1887.

Application filed November 13, 1886. Serial No. 218,753. (No model.) Patented in England May 27, 1884, No. 8,266.

*To all whom it may concern:*

Be it known that I, THOMAS HIGGIN, a subject of the Queen of Great Britain, and a resident of the city of Liverpool, in the county of Lancaster, in that part of the United Kingdom of Great Britain and Ireland called England, salt-merchant, have invented a new and useful Process for Separating Sand-Scale, Hard Pan-Scale, and other Impurities from Salt, (for which I have obtained a patent in Great Britain, No. 8,266, dated May 27, 1884,) which process is fully set forth in the following specification.

Previous to this invention, among other methods, lump-salt has been crushed by pulverizing between rollers and also by the action of hammers. These methods, through the nature of their operation, not only pulverize the grains of salt, but at the same time pulverize and mix the impurities in the salt with the salt, which impurities exist in the shape of "pan-scale" and "sand-scale." Salt so pulverized is in a condition in which it is impossible to remove the impurities by sifting, bolting, or other like means. Salt has also been pulverized by subjecting the lump-salt to the action of knives or cutters. This method reduced the salt into such a condition that instead of the pan-scale being pulverized with the salt it was left in the salt in particles of sufficient magnitude to enable their removal from the pulverized salt by the process of sifting or bolting. Although effective, this method does not reduce salt into a condition in which the softer scales or impurities can be removed by sifting or bolting, as they are by the action of the apparatus sometimes broken up into small pieces and mixed inseparably with the salt.

This invention has for its object the disintegration of lump-salt into the particles of which the lump is composed, so that such particles of salt and the particles of other matters—such as pan-scale and sand-scale—which the lumps contain, and which are harder than the salt, shall not be reduced or broken up into equal-sized particles with the salt, but which, through their harder nature, will remain in the salt; when disintegrated, in larger particles than those of the salt, so the lump is disintegrated into such a condition that not only can the pan-scale be removed therefrom, but also the less hard scales, such as sand-scale, can be removed therefrom by the process of sifting or bolting.

I effect the object of this invention by disintegrating the lump-salt by hackling or tearing, as distinguished from crushing, pulverizing, or chipping. The apparatus by which I effect this hackling consists of a surface provided with hackle points or teeth, which in operation disintegrate the lump by a raking action, thus reducing the lump-salt into original grains or crystals, and at the same time leaves the harder particles of the lump—namely, the impurities, pan and sand scale—of sufficient magnitude as to be capable of being removed by sifting or bolting, as hereinafter described.

In carrying out this invention, the hackles or teeth are mounted on the surface of a rotating metal or other cylinder, to which rotating movement is given by any suitable means, or on an endless traveling band, or a reciprocating frame, or revolving disk positioned within a hopper, or equivalent device, into which the lumps of salt are fed. The movement of the hackles or teeth effect the disintegration of the lumps of salt in the manner above described, and the disintegrated salt passes into a receiver, from whence it is fed to the sifting or bolting apparatus, which consists of a circular or hexagonal frame covered with wire or other net-work or gauze, which is inclosed within a larger hexagonal frame, also covered with wire or other gauze. The gauze is varied in size of mesh according to the kind of salt to be produced, so that after extracting the impurities the salt may be either all of one kind or it may be separated into the different-sized grains or crystals of which it is composed, and received through different hoppers for each kind into bags, sacks, boxes, or cases. The impurities are carried along within the bolting apparatus and are finally discharged from it. The bolting frames or apparatus are made to revolve by suitable appliances, and the inner frame may either be fixed to the outer one, so as to revolve with it, or it may be unattached to the outer frame and made to revolve at a different speed.

To enable my invention to be clearly understood, I will now proceed to describe the same more in detail, reference being had to the accompanying two sheets of drawings, making a part of this specification, and to the letters and figures of reference marked thereon, like letters and figures being used to denote the same or corresponding parts throughout the various views and figures.

In the drawings, Figure 1 is a plan in perspective showing the arrangement of hackles or teeth fitted in a base or foundation of metal and leather in the way that I find suitable in carrying out my invention. Fig. 2 is a section through X X, Fig. 1. Fig. 3 is an end view of Fig. 2. Fig. 4 is an elevation of an apparatus for disintegrating lump-salt according to my invention. Fig. 5 is a side view of Fig. 4. Fig. 6 is a front view of the disintegrating device used in Fig. 4. Fig. 7 is an end view of Fig. 6. Fig. 8 is an alternative arrangement or modification of the apparatus shown at Fig. 4. Fig. 9 is a modification of the disintegrating device shown at Fig. 6. Fig. 10 is a sectional end view of Fig. 9.

As before stated, my invention has for its object certain improvements in the disintegration of salt in such a manner that the particles of which the lump is composed are separated into grains or crystals and the foreign matter—namely, the impurities consisting of pan-scale and sand-scale—remain of sufficient magnitude that they are capable of being removed by sifting or bolting.

The means which I employ to effect the object of my invention consist of hackles or teeth, which are mounted on a rotating base or foundation, which may be a cylinder band, frame, or disk. In practice I find that the most convenient form consists of a disk, such as the vertical disk A, shown at Figs. 6 and 7. The disk A is composed of a wooden backing or frame, $a$, upon the face of which are mounted and carried hackles or teeth $b$, which hackles or teeth $b$ are mounted in a foundation consisting of a metal plate, $c$, and a leather backing, $d$, the hackles $b$ being formed as staples and passed through (from the back) the foundation of leather $d$ and metal $c$, the points of the hackles being bent over in the same direction and pitched and fitted in manner such as shown at Figs. 1, 2, and 3. The foundation thus formed is fixed, preferably, in sections on the face of the wooden frame $a$, and thus the disk A is constructed.

Figs. 4 and 5 illustrate a duplex apparatus, provided with the hackling-disks A. The disks A are mounted on a shaft, B, which is carried by the bearings C and supported on the frame-work D, the shaft B, and thereby the disks A, being caused to rotate at a high speed by a pulley and belt or other equivalent means. The frame-work D is inclosed so as to form a receptacle or hopper, E. At the top and on each side of the frame D and in front of the disks A there is provided an inclined chute, F, and a casing, G, which incloses the upper portion of the disks A. The front of each casing G is provided with an aperture, $e$, so that the lumps of salt which in operation are fed down the chute F can be held or come against, through the aperture $e$, the hackle-teeth $b$ of the disk A, which by its rotation causes the teeth $b$ to disintegrate the lump-salt, which then falls into the receptacle E, from which it is removed by the bucket-elevator H, provided for that purpose, and which delivers the disintegrated lump-salt to the sifting or bolting apparatus, which may be of any known form convenient for the purpose of separating the disintegrated salt and removing therefrom the impurities of pan-scale and sand-scale, which removal has been rendered possible by the nature of the disintegration, which has left the pan-scale and sand-scale, through their harder nature, in larger particles than the salt-crystals.

In the arrangement of the apparatus shown at Fig. 8 the disks A are dished and set to run horizontally, the lumps of salt are fed into the hopper or chute F, and the disintegrated salt is discharged through the eye A' of the disk A into the receptacle E, the construction of the disk being the same as previously described in reference to Figs. 6 and 7.

Instead of using the dished disk, as shown at Fig. 8, a horizontal rotating cylinder, A, as shown at Figs. 9 and 10, may be substituted, the periphery of the cylinder A being covered with hackle-teeth $b$, mounted on a foundation, such as shown in reference to Figs. 1, 2, and 3.

The disintegration of lump salt in the manner and by an apparatus such as is herein described and shown enables the production of commercial salt, and more particularly what is known as "butter-salt," of very superior quality, because through the nature of the disintegration the particles or crystals of salt are produced without crushing, and the pan-scale and sand-scale is left in such a condition that it can be removed from the disintegrated salt by sifting or bolting, and the objectionable hard particles often found in butter-salt are avoided.

I claim as my invention—

The method of treating lump-salt for disintegrating, separating, and purifying it, consisting, substantially, of first subjecting the lumps to a tearing or hackling operation by which the lumps are reduced and the soft sand-scale as well as the harder pan-scale are torn or raked from the salt without being crushed with it, and, second, passing the salt, sand-scale, and pan-scale so disintegrated through sieves or screens by which the sand-scale and pan-scale are separated from the salt, as set forth.

THOMAS HIGGIN.

Witnesses:
WILLIAM HENRY WILLIAMS,
FREDERICK JOHN PICKERING CHEESBROUGH,
*Both of Water Street, Liverpool, England.*